(12) United States Patent
O'Hare et al.

(10) Patent No.: US 10,896,153 B2
(45) Date of Patent: Jan. 19, 2021

(54) LARGE BLOCK MISALIGNED DEDUPLICATION

(71) Applicant: EMC IP HOLDING COMPANY LLC, Hopkinton, MA (US)

(72) Inventors: Jeremy J. O'Hare, Westborough, MA (US); Kuolin Hua, Natick, MA (US); Michael J. Scharland, Franklin, MA (US); Stephen M. Lathrop, Milford, MA (US); Anoop Raghunathan, Ashland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 280 days.

(21) Appl. No.: 15/941,218

(22) Filed: Mar. 30, 2018

(65) Prior Publication Data

US 2019/0303454 A1  Oct. 3, 2019

(51) Int. Cl.
*G06F 16/00* (2019.01)
*G06F 16/174* (2019.01)
*G06F 16/13* (2019.01)
*G06F 16/14* (2019.01)

(52) U.S. Cl.
CPC ........ *G06F 16/1752* (2019.01); *G06F 16/137* (2019.01); *G06F 16/152* (2019.01)

(58) Field of Classification Search
CPC .. G06F 16/1752; G06F 16/137; G06F 16/152; G06F 16/00; G06F 17/30; G06F 3/0671; G06F 3/0608; G06F 16/221; G06F 16/2456; G06F 16/2455; G06F 16/22; G06F 16/3334; G06F 16/334; G06F 16/353; G06F 16/335; G06F 16/24578; G06F 16/285; G06F 16/93; G06F 17/241; G06F 17/18; G06K 9/6217; G06K 9/62; G06K 16/00; G06N 20/00; G06N 3/02; G16H 20/00

See application file for complete search history.

(56) References Cited

U.S. PATENT DOCUMENTS

| | | | |
|---|---|---|---|
| 6,564,219 B1 * | 5/2003 | Lee | G06F 16/25 707/769 |
| 7,640,262 B1 * | 12/2009 | Beaverson | G06F 16/2246 |
| 7,673,099 B1 * | 3/2010 | Beaverson | G06F 12/0866 711/118 |
| 7,720,559 B1 * | 5/2010 | Stewart | G05B 19/4187 700/121 |
| 7,720,892 B1 * | 5/2010 | Healey, Jr. | G06F 11/1456 707/831 |
| 7,930,559 B1 * | 4/2011 | Beaverson | G06F 11/1453 713/193 |
| 7,949,637 B1 | 5/2011 | Burke | |

(Continued)

*Primary Examiner* — Anh Ly
(74) *Attorney, Agent, or Firm* — Krishnendu Gupta; Anne-Marie Dinius (57) ABSTRACT

The system, devices, and methods disclosed herein relate to data ratio reduction technology adapted to reduce storage costs by weeding out duplicative data write operations. The techniques and systems disclosed achieve deduplication benefits of smaller block, finer granularity, deduplication systems while simultaneously reducing the enormous metadata costs traditionally associated with small block deduplication. According to an exemplary 128 K block deduplication system and method, we disclose deduplication rates nearly equivalent to 4 K deduplication systems.

12 Claims, 7 Drawing Sheets

(56) References Cited

U.S. PATENT DOCUMENTS

| | | | |
|---|---|---|---|
| 9,081,771 B1* | 7/2015 | Faibish | G06F 16/00 |
| 2008/0250188 A1* | 10/2008 | Nakanishi | G06F 11/1441 |
| | | | 711/1 |
| 2009/0089483 A1* | 4/2009 | Tanaka | G06F 3/0641 |
| | | | 711/103 |
| 2013/0060990 A1* | 3/2013 | Yeh | G06F 12/0246 |
| | | | 711/103 |
| 2018/0129429 A1* | 5/2018 | Huang | G06F 12/08 |

* cited by examiner

LARGE BLOCK MISALIGNED DEDUPLICATION

FIELD OF THE INVENTION

This disclosure is related to the field of data storage and, more particularly, to systems and methods for improving data deduplication for misaligned blocks.

BACKGROUND

As we move into cloud-based computing environments, more and more data are being stored and made available to end users. In the not so distant past, the most voracious consumers of data were all corporate entities. More recently, the cost of data transmission and storage have decreased. With that decrease in cost has come an increase in data volume. Storing the ever increasing documents, emails, Excel spread sheets, PowerPoints, employee records, financial records, photographs, videos, and the like, that get distributed throughout a network on a daily basis is a daunting task for data storage providers and the organizations who purchase their products.

In order to provide reliable, and oftentimes redundant data storage, data storage systems routinely perform back-ups as a means of protecting against equipment failure within a data storage system. While data back-ups are an essential means of ensuring data availability into the future, they have the drawback of multiplying data by duplicating data files in a way that can grow exponentially very quickly. In a system where there is no removal of redundant data files, data backups can contain enormous amounts of redundant data. As an example, if someone in a company having an email back-up system in place shared a video with his co-workers via email and the video went viral within the organization, there would be many, many copies of the same video stored on the email back-up data storage system.

As the need for data storage continues to grow, the importance of data reduction technology becomes increasingly important to address the cost of storage. There are many flavors of data reduction technology, but generally, they fall into two categories: compression and deduplication. Compression involves a complex algorithm of looking for patterns within a buffer, and finding ways to store them more efficiently, resulting in a smaller buffer. The larger the buffer is, the better the compression results will be because there are more opportunities to find patterns.

Deduplication does not modify the buffer, but rather looks at all of the buffers where data has already been stored to see if there are any matching data strings. Counter to compression, deduplication works best for smaller buffers. As an example, it is easier in a library to find two words that match than it would be to find two sentences or two pages.

Block level storage arrays typically perform compression and deduplication at 4 K, 8 K, 16 K, and 128 K blocks. In these increments, the smaller blocks receive better deduplication, while the larger blocks receive better compression. Another extremely important impact of block size is the cost of metadata (MD). Arrays storing data at the 4 K level require 32 times more metadata than similar arrays using a 128 K block size. It would be advantageous to be able to use the combined advantages of larger block size in terms of reducing the metadata cost, while simultaneously being able to achieve the superior deduplication rates attainable with smaller block sizes.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter that is set forth by the claims presented below. All examples and features mentioned below can be combined in any technically possible way.

Our solution provides the ability for large block (128 K) deduplication, but with an offsetting ability which provides nearly the same deduplication abilities as small block deduplication, but at a fraction of the metadata costs. In some embodiments, deduplication can be performed on 128 K blocks. The solution also permits large block compression and IO such that the data reduction ratio ("DRR") reaches optimal levels, and large block performance does not suffer from severe fragmentation. Our solution proposes a mapping layer that permits the benefits of large block storage, while maintaining nearly the same deduplication rate as small block storage.

In some embodiments, we disclose systems, methods, and products for deduplicating data within a data storage system during a write operation. Data deduplication is accomplished by calculating a plurality of hash values for a plurality of data chunks within an unwritten data block, each hash value having a one-to-one correspondence with an individual data chunk within the plurality of data chunks; querying a hash table to determine if a match can be found for each of the of the plurality of hash values in at most two sequential patterns, the sequential patterns corresponding to physical data block locations for the plurality of data chunks; if the query results in a single physical data block location match, recording a pointer within a virtual table of pointers corresponding to a physical location of the single physical data block location; and if the query results in a double physical data block location match: recording a first pointer within the virtual table of pointers corresponding to a first physical data block location; recording a hash value offset; and recording a second pointer within the virtual table of pointers corresponding to a second physical data block location.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system. Additionally, method steps disclosed herein can be performed within a processor, a memory, a computer product having computer code loaded thereon, and the like.

Figure 1:
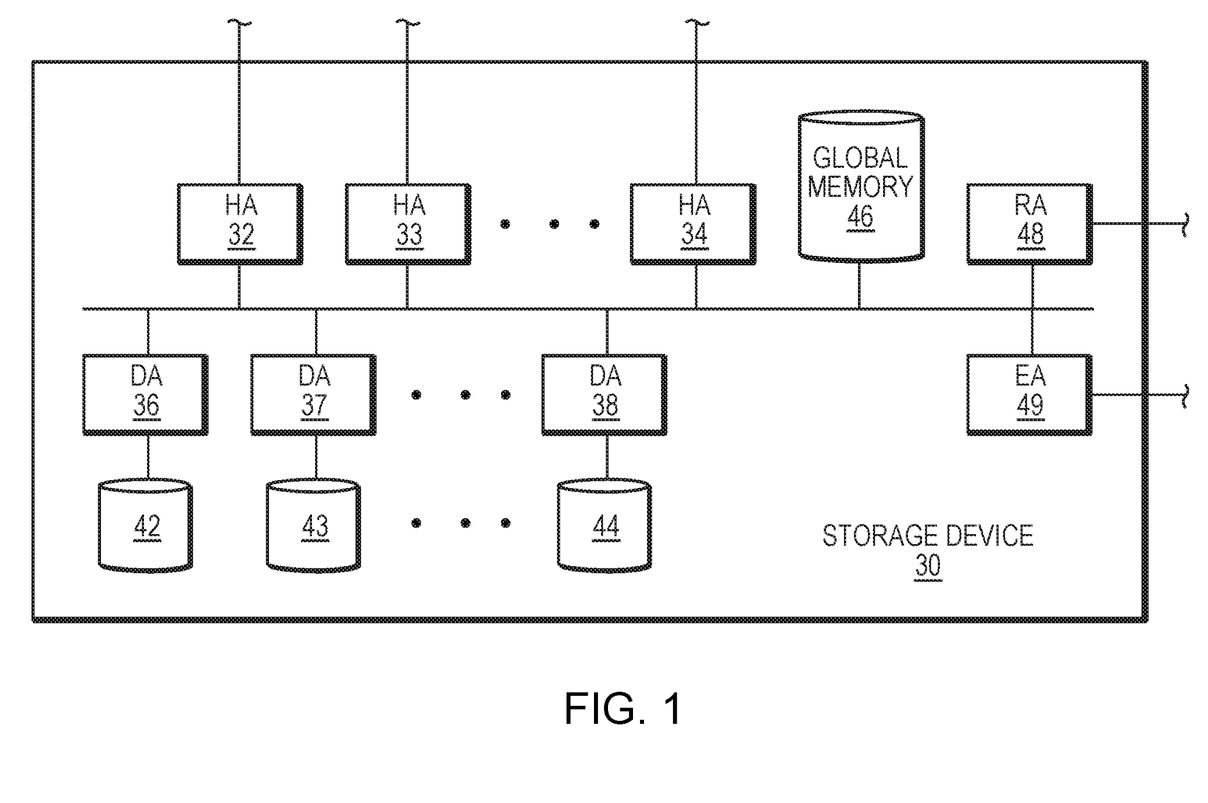
FIG. 1 is a schematic diagram showing a plurality of hosts and a data storage device in connection with an embodiment of the system described herein.

FIG. 1 is a schematic illustration showing a storage device 30 that includes a plurality of host adapters (HA) 32-34, a plurality of disk adapters (DA) 36-38 and a plurality of disk drives 42-44. The disk drives 42-44 should be understood as representing any appropriate type of storage media, including, without limitation, DRAM cache, flash or other solid-state storage device, tape, optical media, and/or any combination of permanent, semi-permanent and temporally-limited storage media. Each of the disk drives 42-44 is coupled to a corresponding one of the DA's 36-38. Although FIG. 1 shows a one-for-one correspondence between the DA's 36-38 and the disk drives 36-38, it should be understood that it is possible to couple more than one disk drive to a DA and/or to couple more than one DA to a disk drive. The storage device 30 also includes a global memory 46 that may be accessed by the HA's 32-34 and the DA's 36-38. The storage device 30 also includes an RDF adapter (RA) 48 that may also access the global memory 46. The RA 48 may communicate with one or more additional remote storage devices (not shown) and/or one or more other remote devices (not shown) via a data link 22. The storage device also includes an external storage adaptor (EA) 49 that may be used to communicate with one or more other storage devices (not shown) that could either be the same type of storage device as the storage device 30 or could be a different type of storage device. The HA's 32-34, the DA's 36-38, the global memory 46, the RA 48 and the EA 49 may be coupled to a bus 24 that is provided to facilitate communication therebetween. In various embodiments, additional RA's and/or EA's may be incorporated into the storage device 30.

Each of the HA's 32-34 may be coupled to one or more host computers (not shown) that access the storage device 30. The host computers (hosts) access data on the disk drives 42-44 through the HA's 32-34 and the DA's 36-38. The global memory 46 contains a cache memory that holds tracks of data read from and/or to be written to the disk drives 42-44 as well as storage for tables that may be accessed by the HA's 32-34, the DA's 36-38, the RA 48, and the EA 49. Note that, for the discussion herein, blocks of data are described as being a track or tracks of data. However, it will be appreciated by one of ordinary skill in the art that the system described herein may work with any appropriate incremental amount, or section, of data, including possibly variable incremental amounts of data and/or fixed incremental amounts of data and/or logical representations of data, including (but not limited to) compressed data, encrypted data, or pointers into de-duplicated data dictionaries.

Figure 2:
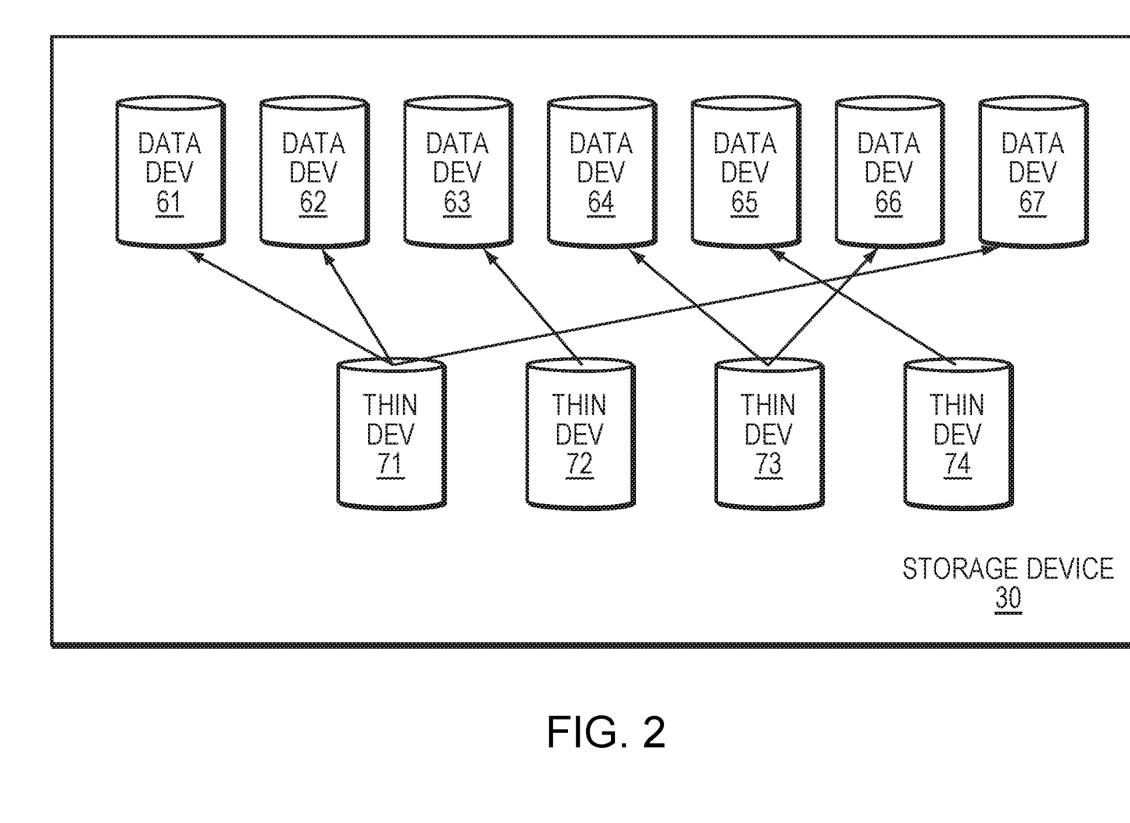
FIG. 2 is a schematic diagram showing a storage device including thin devices and data devices in connection with an embodiment of the system described herein.

FIG. 2 is a schematic diagram showing the storage device 30 as including a plurality of data devices 61-67. Data devices 61-67 may be implemented as logical devices like standard logical devices provided in a Symmetrix data storage device. In some embodiments, the data devices 61-67 may not be directly useable (visible) to hosts coupled to the storage device 30. Each of the data devices 61-67 may correspond to a portion (including a whole portion) of one or more of the disk drives 42-44. Thus, for example, the data device 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein.

The storage device 30 may also include one or more thin devices 71-74. Each of the thin devices 71-74 may appear to a host coupled to the storage device 30 as a logical volume (logical device) containing a contiguous block of data storage. Each of the thin devices 71-74 may contain tables that point to some or all of the data devices 61-67 (or portions thereof), as further discussed elsewhere herein. In some instances, the thin devices 71-74 may be concatenated to form a metavolume of thin devices. In some embodiments, only one thin device may be associated with the same data device while, in other embodiments, multiple thin devices may be associated with the same data device.

In some embodiments, it may be possible to implement the system described herein using storage areas, instead of storage devices. Thus, for example, the thin devices 71-74 may be thin storage areas, the data devices 61-67 may be standard logical areas, and so forth. In some instances, such an implementation may allow for hybrid logical devices where a single logical device has portions that behave as a data device and/or portions that behave as a thin device. Accordingly, it should be understood that, in appropriate instances, references to devices in the discussion herein may also apply to storage areas that may or may not correspond directly with a storage device.

In today's storage systems, about 25% of the overall cost of the storage system is the storage engine and its associated software, hardware, and firmware. The remaining 75% of the cost can be attributed to the storage drives. Against this backdrop, it stands to reason that improving data storage efficiency would dramatically reduce data storage costs. Data Reduction Ratio is a key indicator of improve data storage efficiency. The systems and methods disclosed herein improve DRR, and accordingly, improve the efficiency and performance of data storage devices.

Systems, methods, and computer program products disclosed herein could be executed on architecture similar to that depicted in FIGS. 1 and 2. For example, method steps could be performed by processors either communicatively coupled to storage device 30 or internal, to storage device 30. Similarly, global memory 46 could contain computer executable code sufficient to orchestrate the steps described and claimed herein. Likewise a computer program product internal to storage device 30 or coupled thereto could contain computer executable code sufficient to orchestrate the steps described and claimed herein.

Figure 3:
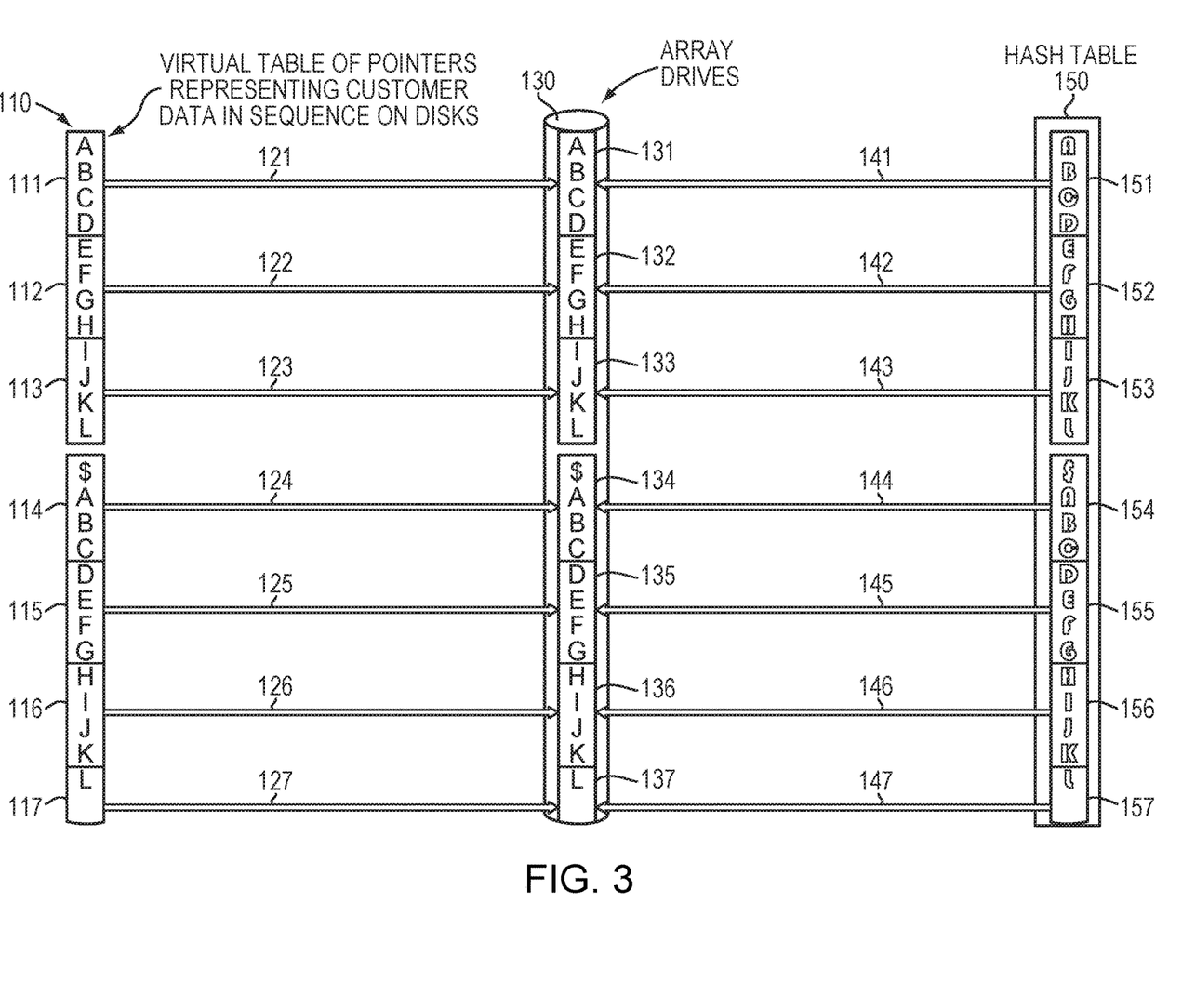
FIG. 3 is a schematic diagram showing a storage device including thin devices and data devices in connection with an embodiment of the system described herein.

By way of background and with reference to FIG. 3, we highlight data storage inefficiencies in the situation where two nearly identical blocks of data are committed to permanent storage even though a large segment of the data is duplicative. With reference to FIG. 3, we show a data storage system 100 having a virtual table of pointers 110, which point to data stored in array drives 130. Array drive 130 is equivalent to data devices 61-67 as shown in FIG. 1. The virtual table of pointers 110 represents sequential customer data stored in accordance with thin provisioning or virtual provisioning in accordance with the teachings of exemplary U.S. Pat. No. 7,949,637, co-owned by Applicant, and all incorporated in their entirety by reference. The virtual table of pointers 110 could be stored in thin devices 71-74.

In this example, the storage array allocation is 128 KB. That is, storage array blocks 131-137 each contain 128 KB of storage space. The letters A-L each represent a unique 32 KB chunk of data, four 32 KB data chunks per 128 KB data block 131-137. Those of skill in the art will recognize that the storage array allocation size as well as the data chunk size could vary in alternate embodiments without deviating from the teachings disclosed herein. In embodiments, storage array allocation sizes could range from 4 K up to 1024 K (1 MB), likely in a power of 2, while data chunk sizes could fall within the same range. In most embodiments, the data chunk size would not exceed the storage array allocation size.

As those familiar with thin provisioning, also called virtual provisioning will recognize, each time a particular letter is used herein, it is understood that the underlying data representing that letter would exactly match in all instances where that letter appears in a figure or in this Specification. For example, the data represented by data chunk "A" in block 111, which is a thin provisioning table 110, exactly matches the data represented by data chunk "A" in block 114, which is also a part of the thin provisioning table. Data chunks "A" in blocks 111 and 114 are exact matches to the data stored in storage device 130 at data blocks 131 and 134.

Those familiar with thin provisioning will also recognize that pointers 121-127 are used to provide metadata sufficient for hosts to adequately locate each data chunk represented within thin provisioning table 110. In FIG. 3, for example, pointer 121 allows host to locate data chunks ABCD contained in virtual data block 111 by directing host, through metadata stored within thin provisioning table to data block 131 on data storage device 130. Similarly, pointers 122 and 123 direct the same host to the physical location for virtual data blocks 112 and 113 in data storage device 130.

A second host may seek to have virtual data blocks 114-117 stored in storage device 130. Pointers 124-127 facilitate this storage by directing the second host to physical locations for each of these blocks, namely to blocks 134-137, respectively.

Hash table 150, which could be stored in memory 46, contains a series of fingerprints/hashes, which correspond to each 32 KB data block A-L, on a one-to-one basis. For example, the hash value for data chunk A is represented by A in blocks 151 and 154 of hash table 150. Hash table 150 similarly employs pointers 141-147 to show the physical location of the actual data corresponding to each hash value. In exemplary embodiments, hash values A-L could each be 32B hashes used to uniquely identify the pattern found in its respective data chunk. In alternate embodiments, the size of the hash values could vary without deviating from the teachings herein.

In the system depicted in FIG. 3, it is possible for a user to set a deduplication threshold value based on data size. If for example, a user wanted to prevent duplicative write operations on a block-by-block basis, i.e., at a 128 K aligned deduplication value, all data chunks pictured in FIG. 3 would be written to storage device 130 even though duplicate values of data chunks A-L exist in storage blocks 131-133 as compared with storage blocks 134-137. The misalignment of the data string A-L shown in virtual blocks 114-117 would prevent the data deduplication mechanisms used currently from recognizing the duplication. Accordingly, a significant amount of data would be redundant. Embodiments discussed herein overcome this shortcoming thereby improving computer performance, efficiency, and functionality, while simultaneously reducing cost.

Figure 4:
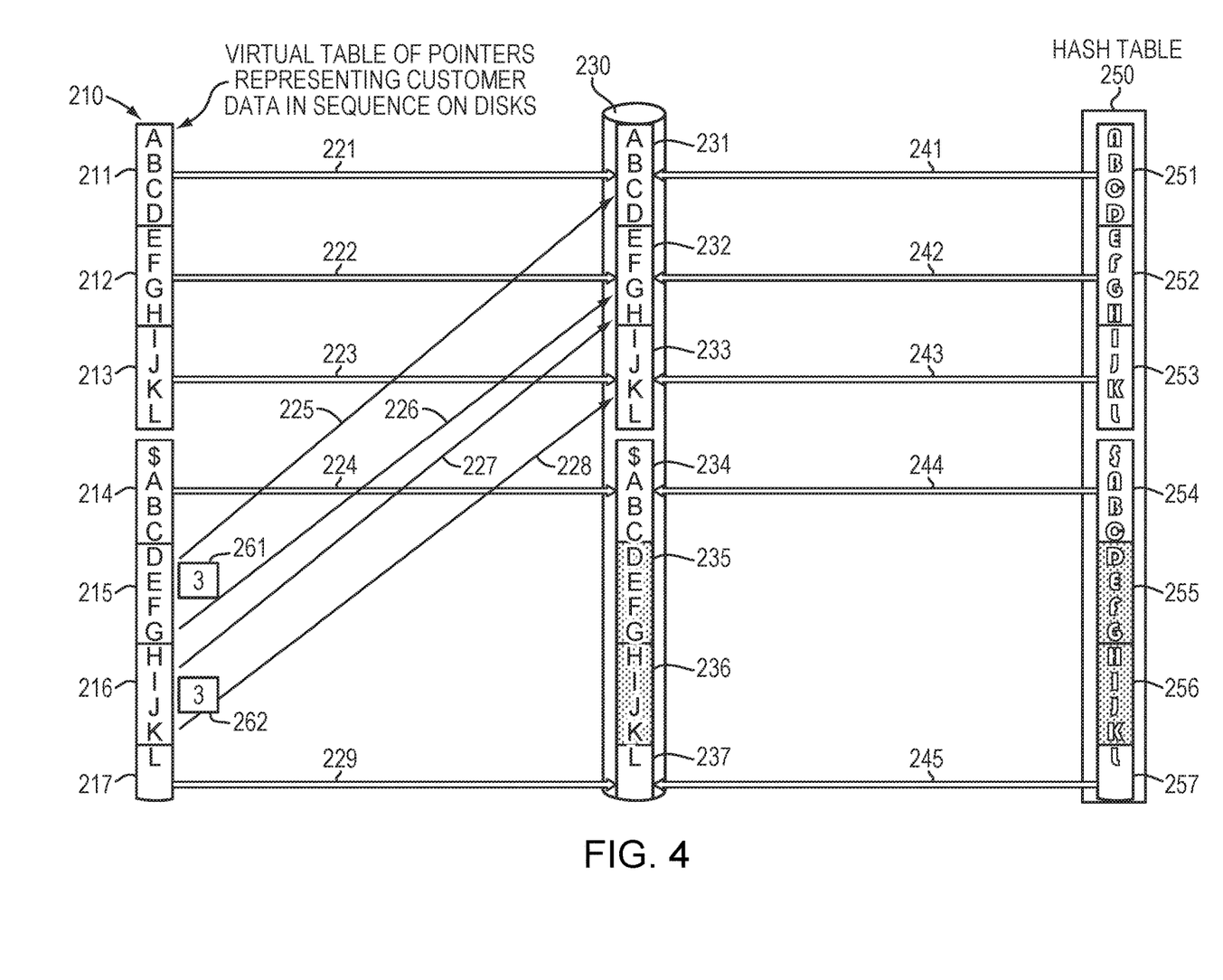
FIG. 4 is a schematic diagram showing a storage device including thin devices and data devices in connection with an embodiment of the system described herein.

With reference to FIG. 4, we show a data storage system 200 having similar parameters and flexibilities as described with reference to FIG. 3. For illustrative purposes we use a data 128 K data deduplication value. Those of skill in the art will recognize that this threshold could be as low as 4 K and as high as 1024 K (1 MB) in alternate embodiments. The main difference between the methods employed and the systems utilized in FIG. 4 as compared with FIG. 3, is the misalignment, which resulted from the placement of the "$" in block 214 will not prevent these embodiments from recognizing the redundancy of data block 215 as compared with data blocks 211 and 212 and data block 216 as compared with data blocks 212 and 213.

Prior to a data block being written to data storage device 230, also called data storage arrays, the methods disclosed would determine if a threshold value, in this case 128 K of data had already been stored in at most two data blocks within data storage array 230. Said differently, it is possible with this deduplication system to avoid duplicate commitments of data on a partial block basis. Initially, when data blocks 211, 212, and 213 are written to storage array 230, they would be stored as shown in FIG. 4. Pointers 221, 222, and 223 direct the host to the physical location of data blocks 211, 212, and 213, respectively.

Likewise, the hash values, on a data chunk-by data chunk basis, are stored in hash table 250. Hash value 251 corresponds to data block 211, while hash value 252 corresponds to data block 212. And hash value 253 corresponds to data block 213. Hash table 250 could be stored in memory 46. Pointers 241-243 show the physical location of the actual data corresponding to each hash value.

Figure 5:
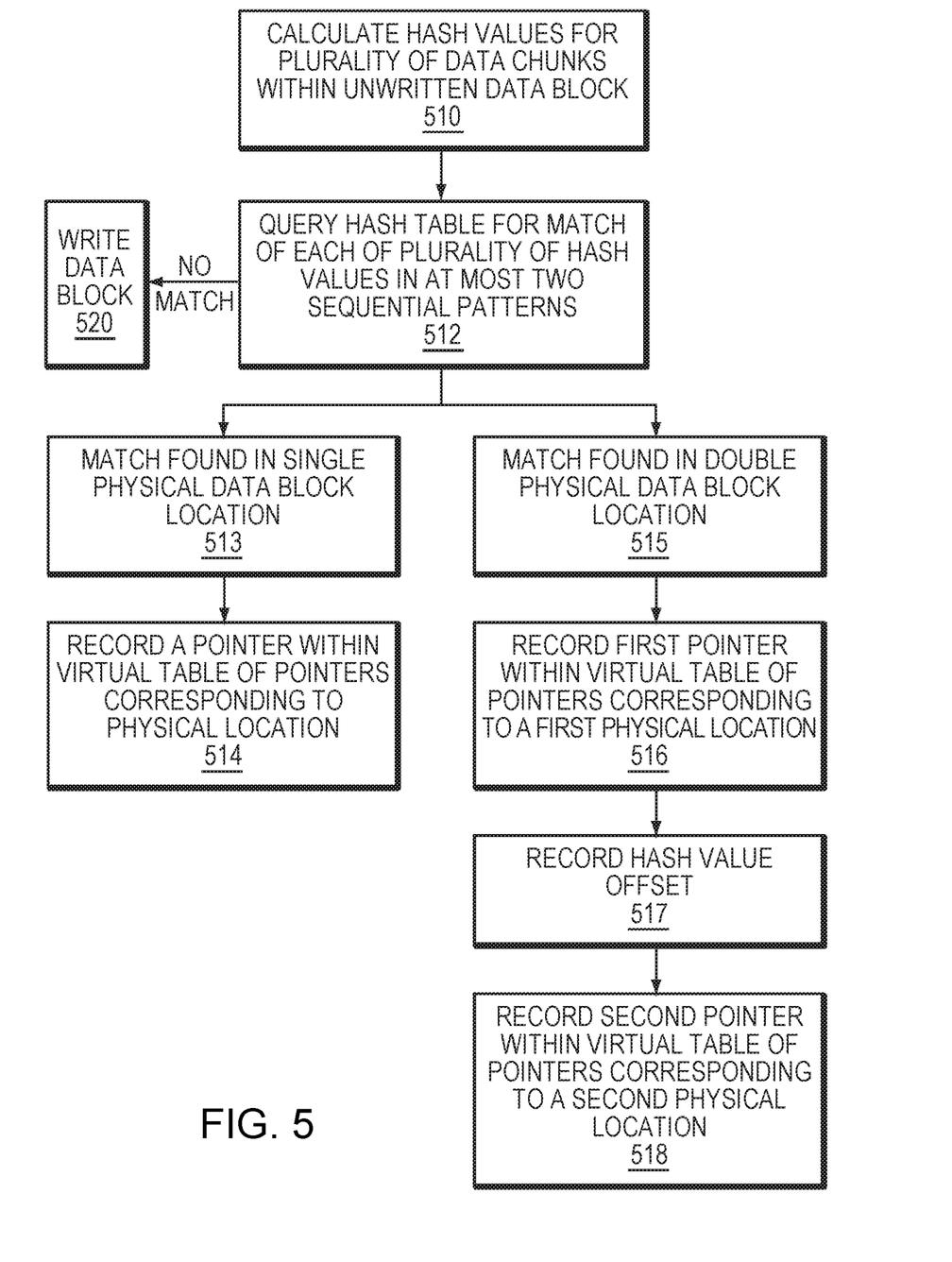
FIG. 5 is a flow chart showing exemplary steps according to systems, methods, and devices disclosed herein.

The novelty of disclosed embodiments will be apparent with respect to writing data blocks 215-217 using embodiments herein. FIG. 5 shows a flow chart of the steps that will be taken by and within the data storage system 200 before writing data block 215.

As stated earlier, it is a goal of this invention to enhance deduplication efforts within data storage systems. One way to enhance deduplication is to avoid storing duplicate data at the outset. Toward that end, and focusing on data block 215, which is an unwritten data block, scheduled to be written to data storage array 230. If, in embodiments, we determine that data chunks "DEFG" in data block 215 have already been stored in storage array 230, it would be advantageous, from a space-saving standpoint, to store pointers to the physical locations of the previously written data chunks "DEFG."

In order to achieve this goal, we calculate 510 a hash value for the plurality of data chunks within unwritten data block 215, namely chunks D, E, F, and G. In this embodiment, each data chunk is 32 K. Next, we query 512 the hash table 250 on a data chunk-by-data chunk basis to determine if there is a match. In this instance, the query 512 would reveal a matching hash value for data chunk D at hash block 251. In this embodiment, we use a 128 K deduplication threshold, which means we choose not to write the unwritten data block if we find 512 at most two sequential patterns. Specifically, data block 215 will not be written if we find any of the following combinations when querying 512 the hash table:

DEFG in a single block within physical storage;
@DEF in a first block within physical storage and G@@@ in a second block within physical storage;
@@DE in a first block within physical storage and FG@@ in a second block within physical storage; or
@@@D in a first block within physical storage and EFG@, in a second block within physical storage, where @ is a non-interesting pattern.

In performing the querying step 512, and with reference to FIG. 4, embodiments would determine that data chunk D resides in one physical block location, 231, and data chunks E, F, and G reside in a second physical block, namely data block 232. We refer to this as being a double physical data block location because the sequential pattern of D, E, F, and G is found in that same sequence, but separate into two different physical data block locations. In FIG. 4, these double physical data blocks 231, 232 are contiguous. This is not a requirement for embodiments herein. In alternate embodiments, double physical data blocks could be for example blocks 231 and 233, or 231 and 234, and so forth.

Of note, if there is no match within hash table 251 for each of the data chunks, the data block is written 520. This can be seen for example with regard to data block 214 in FIG. 4. The systems and methods herein would look to hash table 250 to determine if a hash for data chunk "$" could be found. Once no hash for "$" was found, the entire data block 214 would be written to physical data storage 230 at data block 234. Similarly, if any of the four data chunks was not found in at most two physical block locations, and in sequential order, the unwritten data block would be written 520 to physical storage 230. An example, not pictured, would be with respect to unwritten data block 216, if the hash table query 512 indicated that data chunk H was located in physical storage 230, but data chunks I, J, and K were either not all located in a second data block in physical storage 230 or the data chunks were in a single block in physical storage, but they were not in sequential order.

Referring to FIG. 5, if there is a match 513 for all four unwritten data chunks in a single physical data block, we record 514 a pointer in a virtual table of pointers, which could be stored in memory 46. The pointer corresponds to a physical location within the storage array 230 of the single data block containing a complete sequential match for the four data chunks.

If, on the other hand, a match is found 515 in a double physical data block, we record 516 a first pointer 225 to a first physical location. The first pointer 225 is recorded in a virtual table of pointers, which could be stored in memory 46. With reference to FIG. 4, a first pointer 225 shows that data chunk D can be found in physical data block 231. Next, we record 517 a hash value offset 261. The hash values offset 261 indicates that data chunk D appears after the first three data chunks in physical data block 231. In some ways, hash value offset 261 instructs the processor executing the method steps to ignore the first X amount of data chunks in the first physical location 231. In FIG. 4, the hash value offset 261 for unwritten data block 215 is 3. In alternate embodiments, the hash value offset could range from 0 to 3.

After the hash value offset has been recorded, we record 518 a second pointer 226 within the virtual table of pointers. The second pointer 226 is used to show where the remaining sequential data chunks can be found within physical storage 230. In the example depicted in FIG. 4, second pointer 226 shows that remaining data chunks E, F, and G are located in data block 232.

When these steps are performed, the systems and methods herein would result in unwritten data block 215 not being written to physical storage 230. Rather, we record two pointers and an offset in memory 46, thereby saving precious and costly physical storage space. In the example depicted in FIG. 4, systems and methods would also choose to store two pointers 227, 228 and an offset 262 for unwritten data block 216. In this example, we save a total of 256 KB of physical data storage 230 space.

Figure 6:
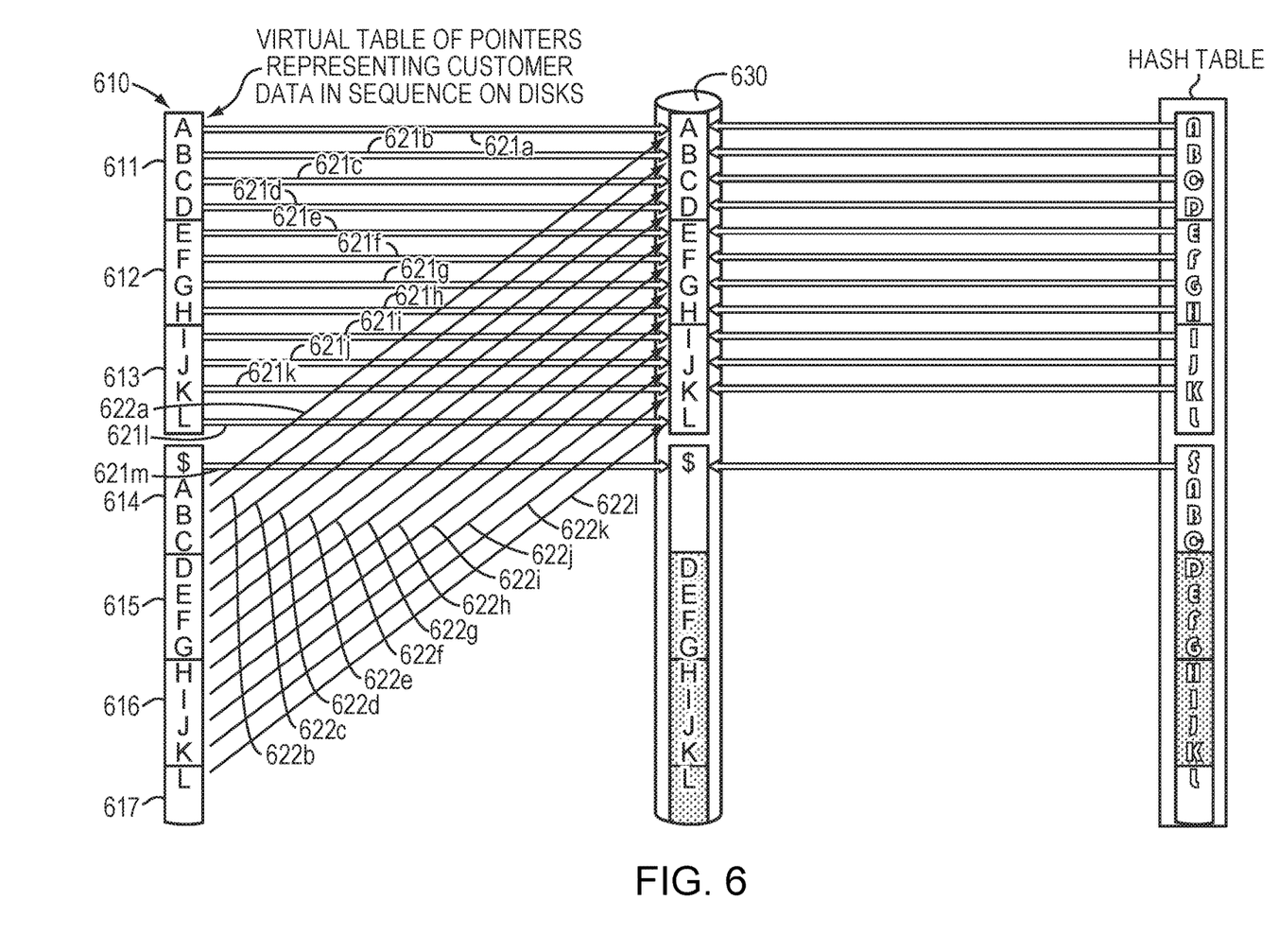
FIG. 6 is a schematic diagram showing a storage device including thin devices and data devices in connection with an embodiment of the system described herein.

The storage of pointers 224-228 and hash value offsets 261, 262 can be done in metadata, which has a lower cost. In some prior art deduplication systems having a more granular deduplication threshold, the cost of metadata storage can become quite high. In fact, in some fine granularity deduplication systems, the cost of storing the metadata associated with the deduplication offsets any deduplication benefits these systems may impart. FIG. 6 is illustrative.

FIG. 6 depicts a system employing 32 K aligned deduplication for data blocks 610. In this system, data blocks 611-613 are physical written in data storage 630. Pointers 621a-621m are stored in a virtual table of pointers and allow hosts to physically locate the data in data blocks 611-613. In the 32 K aligned deduplication system of FIG. 6, when it comes time to determine if un written data block 614 should be written to physical storage 630, this determination will be made on a 32 KB granularity basis, meaning each data chunk will be individually evaluated to determine if it has already been written to physical storage 630. In unwritten data block 614, data chunk "$" will be recorded in physical storage at the location indicated by pointer 321m. Data chunk "A," however, will not be recorded because the deduplication system will determine that data chunk "A" has already been stored in physical storage 630. As a result, pointer 622a will be recorded in a virtual table of pointers showing the connection between unwritten data chunk "A" and its location in physical storage 630. Similarly, for data chunks "B" through "L," this 32 K aligned deduplication system store pointers 622b-6221 to record the correlation between unwritten data chunks "B" through "L" in data blocks 614-617 and their respective locations within physical storage 630.

As can be seen from FIG. 6, this type of deduplication mechanism results in a substantial amount of overhead by virtue of having to store data associated with pointers 622a-6221. The embodiments disclosed herein do not suffer from the same drawbacks. Rather, they provide an enormous savings by virtue of reducing the number of pointers required to show where duplicate data resides. The higher the deduplication granularity, the larger the number of pointers, which in turn means the larger the amount of metadata required to keep track of all of the pointers.

For embodiments using a 128 K deduplication block size with 32 K data chunks (128 K/32 K), we would reduce the number of pointers by ½ to ¼. In alternate embodiments, using a 128 K/8 K deduplication/data chunk size, we reduce the number of pointers by $1/16^{th}$ as many as compared with an 8 K/8 K deduplication method/product.

Figure 7:
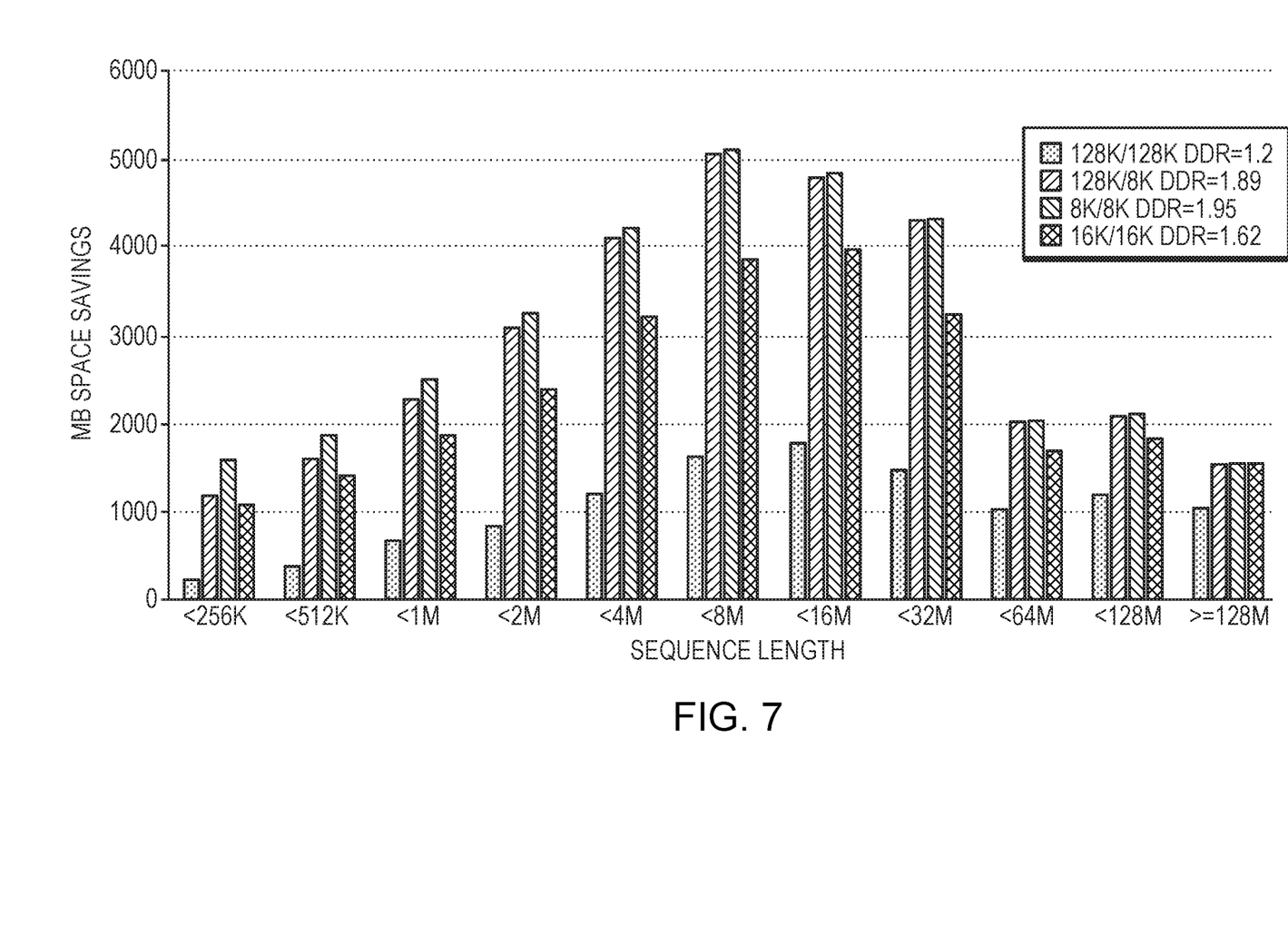
FIG. 7 is a chart showing performance of embodiments disclosed herein.

FIG. 7 compares our deduplication results using a 128 K block size and an 8 K data chunk size to alternate deduplication methods/sizes. As can be seen in FIG. 7, our deduplication embodiments provide deduplication results equivalent to, or nearly equivalent to, deduplication using an 8 K deduplication block size with an 8 K data chunk size. As previously stated, however, the 8 K/8 K deduplication product would require 16 times as many pointers, thereby significantly increasing the metadata storage costs.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer executable method for deduplicating data within a data storage system during a write operation comprising the steps of:
    a. calculating a plurality of hash values for a plurality of data chunks within an unwritten data block, each hash value having a one-to-one correspondence with an individual data chunk within the plurality of data chunks;
    b. querying a hash table to determine if a match can be found for each of the of the plurality of hash values in at most two sequential patterns, the sequential patterns corresponding to physical data block locations for the plurality of data chunks;
    c. if the query results in a single physical data block location match, recording a pointer within a virtual table of pointers corresponding to a physical location of the single physical data block location; and
    d. if the query results in a double physical data block location match:
        i. recording a first pointer within the virtual table of pointers corresponding to a first physical data block location;
        ii. recording a hash value offset; and
        iii. recording a second pointer within the virtual table of pointers corresponding to a second physical data block location.

2. The computer executable method of claim 1 further comprising, if no sequential match of the plurality of hash values can be found, writing the data block to the data storage device.

3. The computer executable method of claim 1 wherein a size for each of the plurality of data chunks is 32 KB.

4. The computer executable method of claim 1 wherein a size for the unwritten data block is 128K.

5. A system for deduplicating data blocks on a set of storage devices, the system comprising a memory, a processor, and a deduplication engine configured for deduplicating data within a data storage system during a write operation comprising the deduplication engine performing the steps of:
    a. calculating a plurality of hash values for a plurality of data chunks within an unwritten data block, each hash value having a one-to-one correspondence with an individual data chunk within the plurality of data chunks;
    b. querying a hash table to determine if a match can be found for each of the of the plurality of hash values in at most two sequential patterns, the sequential patterns corresponding to physical data block locations for the plurality of data chunks;
    c. if the query results in a single physical data block location match, recording a pointer within a virtual table of pointers corresponding to a physical location of the single physical data block location; and
    d. if the query results in a double physical data block location match:
        i. recording a first pointer within the virtual table of pointers corresponding to a first physical data block location;
        ii. recording a hash value offset; and
        iii. recording a second pointer within the virtual table of pointers corresponding to a second physical data block location.

6. The system of claim 5 wherein the deduplication engine is further configured to perform the steps of writing the data block to the data storage device if no sequential match of the plurality of hash values can be found.

7. The system of claim 5 wherein a size for each of the plurality of data chunks is 32 KB.

8. The system of claim 5 wherein a size for the unwritten data block is 128K.

9. A non-transitory computer readable storage medium having instructions stored thereon when executed by a processor during a write operation, the non-transitory computer readable storage medium comprising instructions for:
    a. calculating a plurality of hash values for a plurality of data chunks within an unwritten data block, each hash value having a one-to-one correspondence with an individual data chunk within the plurality of data chunks;
    b. querying a hash table to determine if a match can be found for each of the of the plurality of hash values in at most two sequential patterns, the sequential patterns corresponding to physical data block locations for the plurality of data chunks;
    c. if the query results in a single physical data block location match, recording a pointer within a virtual table of pointers corresponding to a physical location of the single physical data block location; and
    d. if the query results in a double physical data block location match:
        i. recording a first pointer within the virtual table of pointers corresponding to a first physical data block location;
        ii. recording a hash value offset; and
        iii. recording a second pointer within the virtual table of pointers corresponding to a second physical data block location.

10. The non-transitory computer readable storage medium of claim 9 wherein the non-transitory computer readable storage medium further comprises instructions for writing the data block to the data storage device if no sequential match of the plurality of hash values can be found.

11. The non-transitory computer readable storage medium of claim 9 wherein a size for each of the plurality of data chunks is 32 KB.

12. The non-transitory computer readable storage medium of claim 9 wherein a size for the unwritten data block is 128 K wherein the two or more operational parameters are accorded differing priorities.

\* \* \* \* \*